D. T. ROBINSON.
Coffee Pot.
No. 61,022.
Patented Jan'y 8, 1867.
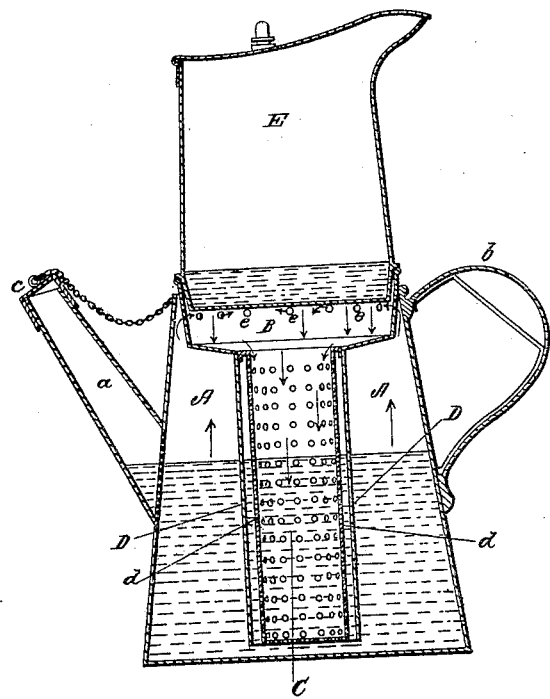
Witnesses:
C. W. Baldwin.
Francis Curtis
Inventor:
Daniel T. Robinson.
by his Attorney:
Frederick Curtis.
No. 61,022.

United States Patent Office.

DANIEL T. ROBINSON, OF BOSTON, MASSACHUSETTS, ASSIGNOR TO PAUL P. TODD, OF SAME PLACE.

*Letters Patent No. 61,022, dated January 8, 1867.*

COFFEE-POT.

*The Schedule referred to in these Letters Patent and making part of the same.*

TO ALL TO WHOM THESE PRESENTS SHALL COME:

Be it known that I, DANIEL T. ROBINSON, of Boston, in the county of Suffolk, and State of Massachusetts, have invented a new and useful Coffee-Pot, or improvements in coffee-pots; and do hereby declare the following to be a full, clear, and exact description thereof, reference being had to the accompanying drawing, making part of this specification, such drawing being a vertical section of a coffee-pot containing my invention or improvement.

My invention is an improvement in the class of coffee-pots known as condensing pots, or those in which the vapor from the boiling decoction of coffee and water is condensed, the condensed liquid being retained and carried back into the boiling decoction, the coffee itself, or coffee "grounds," as the mass is usually termed, being contained within a foraminous or perforated cup, extending within the body of the pot and into the decoction.

My invention consists in surrounding this foraminous cup with a hollow cylinder or tube, as shown in the drawing, the object of this tube being to catch and retain the sediment which would otherwise escape from the foraminous cup, and be drawn through the nose of the pot while pouring its contents from it.

My invention further consists in combining with the pot a receptacle or pitcher, the bottom of which serves as a condensing surface, to condense the vapors arising from the pot, while the pitcher itself answers the purpose of holding and keeping in a warm state milk or any desirable liquid.

In the drawing above referred to, A denotes the body of the pot, it being provided with a discharging nose or spout, $a$, and a handle, $b$, in the usual manner, the outer extremity of the nose having a tightly fitting cap, $c$, applied to it. Fitting tightly into the mouth of the pot A is a shallow, tapering pan, B, attached to the bottom of which, and opening into it, as seen in the drawing, is a foraminous cup or receptacle, C, for containing the ground coffee from which the decoction is to be made, the said cup extending nearly to the bottom of the pot, and being in size about one-third the diameter of the pan B. Surrounding this cup, and so as to leave a small annular chamber or space, $d$, between them, is a cylindrical tube, D, also attached to the bottom of the pan B, and being of equal, or about equal, length with the cup. A series of holes, $e\ e\ e$, &c., are made in the sides of the pan B, to allow of the passage of the vapors from the pot A through them. Surmounting the pan B, and fitting into its mouth, is a pitcher or receptacle, E, for containing milk, or any other liquid which it may be desirable to place within it, the application of the pitcher to the pan B being substantially as shown in the drawing.

In operating with the above-described utensil, the ground coffee is placed within the cup C, and immersed within the boiling water, with which the pot A has been previously partly filled. The pitcher E is then to be put in place within the mouth of the pan B, and heat applied to the lower part of the pot. The vapors generated from the boiling decoction, and which contain most of the "aroma" of the coffee, will rise and pass through the openings $e\ e$, and striking against the bottom of the pitcher E, will be condensed, and will drop into the pan B and the cup C, and thence back into the boiling decoction. In course of time the milk, or other liquid contained within the pitcher, will be warmed to a considerable extent, or sufficiently so for any purposes for which it may be needed.

I do not claim the subject of United States Patent No. 39,115, and granted the 7th of July, 1866; but I claim, in combination with the pan B, and foraminous cup C, the shield or tube D, essentially in manner and for the purpose as described.

DANIEL T. ROBINSON.

Witnesses.
FRED. CURTIS,
W. J. S. HOLWELL.